W. H. GOODFELLOW.
VEHICLE CURTAIN.
APPLICATION FILED DEC. 16, 1912.
1,066,269.
Patented July 1, 1913.
2 SHEETS—SHEET 1.
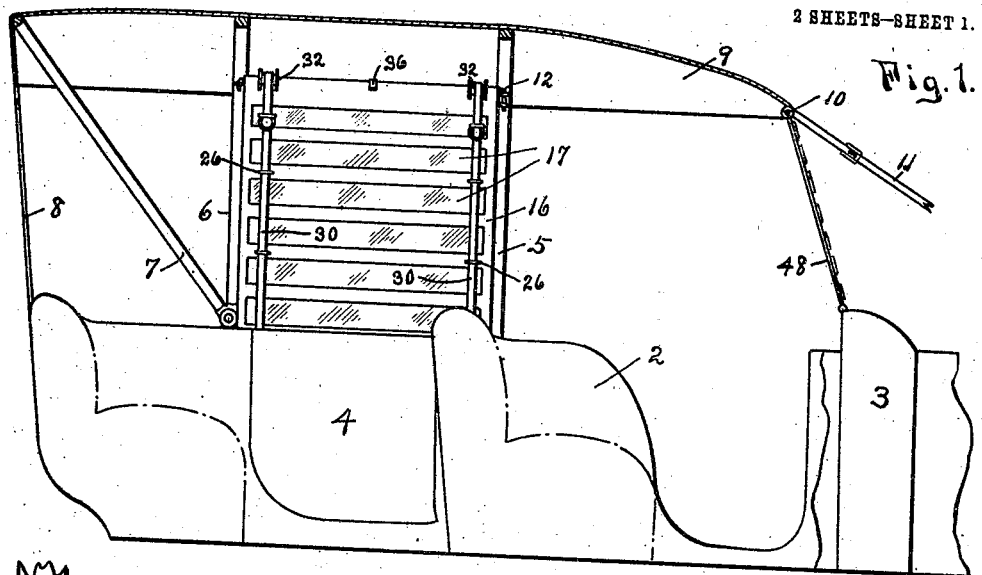
Fig. 1.
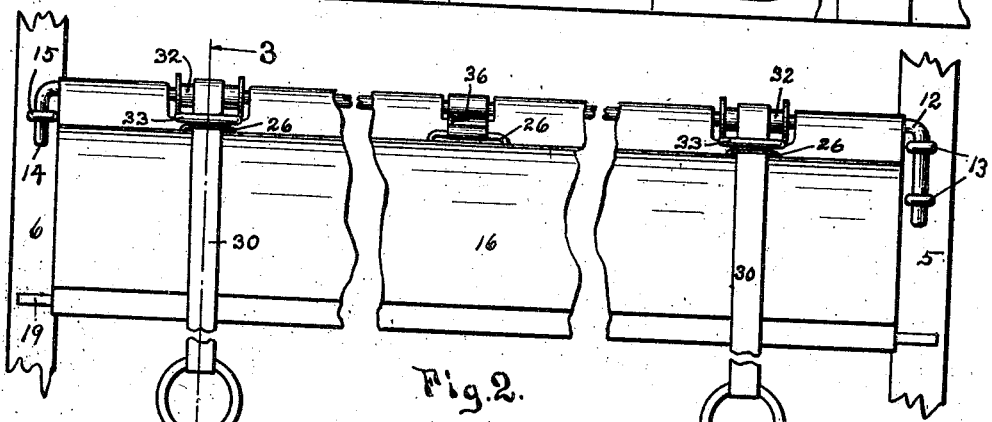
Fig. 2.
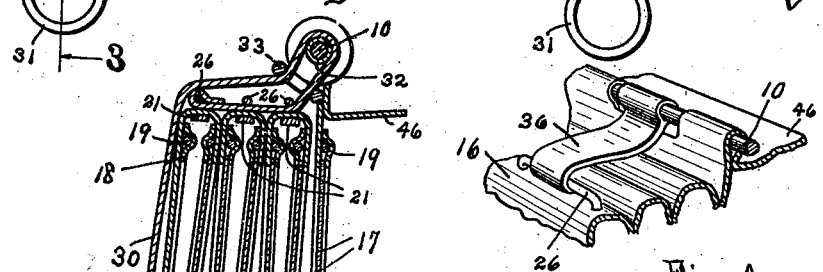
Fig. 3.
Fig. 4.
WITNESSES:
Chas. J. Fitzsimons
Hugo W. Kreinbring
INVENTOR
W. H. Goodfellow.
BY
Edward N. Pagelsen,
ATTORNEY

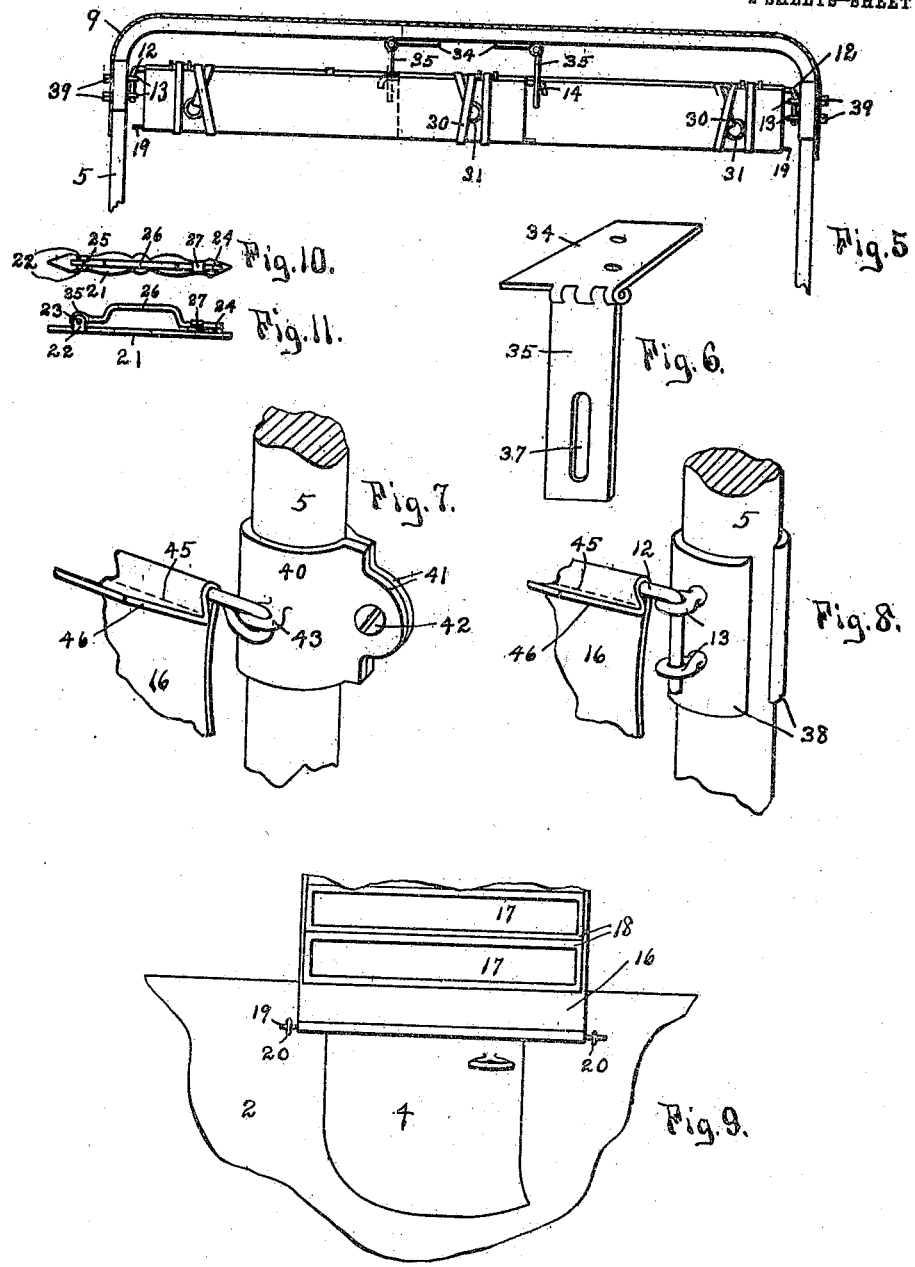

UNITED STATES PATENT OFFICE.

WILLARD H. GOODFELLOW, OF DETROIT, MICHIGAN.

VEHICLE-CURTAIN.

1,066,269.   Specification of Letters Patent.   Patented July 1, 1913.

Application filed December 16, 1912. Serial No. 737,001.

*To all whom it may concern:*

Be it known that I, WILLARD H. GOODFELLOW, a citizen of the United States, and a resident of Detroit, in the county of Wayne and State of Michigan, have invented a new and Improved Vehicle-Curtain, of which the following is a specification.

This invention relates to means for closing the spaces between the bows supporting the tops of vehicles, particularly of automobiles, and its object is to provide a curtain which can be easily raised or lowered, which can be swung transversely of the vehicle so that the top may be collapsed or folded back, and which can be produced at relatively small cost.

This invention consists, in combination with a vehicle and its top, of a curtain composed of longitudinally extending panels of celluloid or other transparent material properly mounted on flexible material such as waterproofed canvas or leather, together with means for raising the curtain, and with further means for holding it in proper position when swung transversely of the vehicle.

In the accompanying drawings Figure 1 is a longitudinal section of an automobile top showing the curtain mounted on the bows. Fig. 2 is an elevation of the curtain when folded. Fig. 3 is a cross section on the line 3—3 of Fig. 2. Fig. 4 is a perspective showing the hook for holding the curtain in folded position. Fig. 5 is a transverse section of the top showing the curtains swung inwardly so that the top may be folded back or collapsed. Fig. 6 is a detail of the device for holding the free end of the curtain in position when swung transversely of the top. Figs. 7 and 8 are perspective views of means for pivoting one end of the curtain-supporting rod. Fig. 9 is an elevation of the bottom end of the curtain when secured in its lowered position. Figs. 10 and 11 are views of the metal guides for the straps used to raise and lower the curtains.

Similar reference characters refer to like parts throughout the several views.

In Fig. 1 an automobile body is shown conventionally and has a side 2, a hood 3 and a side door 4. Extending upwardly from the side are the bows 5, 6 and 7, and the back curtain 8. The covering 9 extends over these bows and may have a front rod 10, and the usual straps 11 may extend from this rod to the front of the hood for the purpose of keeping the top properly stretched. The opening between the bows 5 and 6 through which the passengers leave the vehicle is usually so restricted that it is quite difficult to close the same by means of removable curtains, and stationary curtains cannot be used, for in such a case it would be impossible to gain entrance to the back end of the vehicle. Flexible wire cables have previously been strung between the rods 5 and 6, and curtains have been mounted on these cables. Such a construction, however, is often unsatisfactory for the reason that such curtains must be flexible in order that they may slide freely on the cables, and then the curtain is not stiff enough to resist the pressure of the wind, and it is impossible to insert windows of any length in such curtains. The eyes of passengers in moving vehicles remain substantially at the same level, and objects passing by the windows do so in substantially horizontal planes and therefore all windows should have considerable length horizontally, but their height is a matter of minor importance. But if the window is narrow horizontally, the object is lost to view substantially immediately after it is seen; and if a number of narrow vertical windows are mounted in a curtain or wall, the objects passing these windows are not only indistinct because of the interruptedness of the view, but the continual flicker of the light and shade is very trying on the eyes. I have therefore endeavored to produce a curtain having windows of extreme length, sacrificing the height of these windows to the convenience of folding the curtain.

Pivotally mounted on one of the bows, preferably on the bow 5, is a metal rod 12 which has a down-turned end extending through the eyes 13 projecting from the bow 5. The opposite end of the bar 10 is turned down to form a hook 14 that extends through the eye 15 carried by the bow 6. This bar 10 supports the curtain which is adapted to be folded on horizontal lines and may be drawn up so as to free the opening above the door 4 and between the bows 5 and 6. This curtain is preferably formed from a sheet 16 of canvas or other fabric, preferably waterproof. A series of horizontal openings in this sheet are covered with strips 17 of celluloid or other transparent material, preferably held in position by means of a band 18 of fabric which forms a frame for the same, and stiffened by means of a circumferentially extending wire rod 19. The band 18 is sewed to the sheet 16 and a line of stitches preferably extends through the fabric 16, the celluloid 17 and the band 18. These windows constitute panels which are connected by the fabric 16.

The lower edge of the fabric 16, which forms the curtain, is preferably turned over as shown in Fig. 3 and embraces a rod 19. Referring now to Fig. 9, it will be noticed that the side 2 of the car has a pair of rings 20 projecting outwardly, one on each side of the door 4. The rod 19 is resilient and may be bent so that both of its ends can be inserted in the rings 20, whereupon the rod is released and straightens itself, thereby securing the lower end of the curtain in proper position as shown in Fig. 9. When it is desired to release the lower end, a passenger reaches down between the lower end of the curtain and the door 4 and merely pushes outwardly at the middle of the lower edge of this curtain, thereby bending the rod 19 until the chord of the curve produced in the rod is of less length than the distance between the stationary rings 20, whereupon the curtain will swing outwardly and be free. When this is done it will be necessary to lift the lower end of the curtain and move the rod 19 diagonally inwardly between the bows 5 and 6.

In order to fold up the curtain, as shown in Fig. 3, a series of wire loops are mounted on the flexible material 16 where it forms hinges between the alternate panels. In Figs. 10 and 11 a preferred device is illustrated which forms very desirable loops and consists of a body 21 having a pair of lugs 22 through which a pivot 23 extends. A pin 24 has an eye 25 through which this pivot 23 extends, and this pin 24 is bent outwardly at its middle portion to form a loop 26. The free end of the pin is retained by a hook 27 formed on the opposite end of the body. The pin 24 is pressed through small holes formed in the fabric so that the loop 26 will be on one side of the fabric while the body of this device is on the other. These loops extend a sufficient distance from the fabric to permit a flexible connector, such as a leather strap 30 to pass through the same. The free end of this connector may be provided with a ring 31, and passes around a roller 32 journaled on the rod 10, which roller has end flanges to hold the strap in place. A ring 33 may be employed to hold the connector around the roller 32, as shown in Figs. 2 and 3. After passing through the loops 26 projecting from the inner side of the curtain as shown in Fig. 1, the end of the connector is attached to the lowest loop on the curtain. It will be apparent that any desired form of strap or cord may be employed for this purpose. After the curtain has been folded up in the manner shown in Fig. 3, by pulling down on the connector 32, a hook 36, which is also mounted on the rod 10, may be engaged with another loop 26 projecting from the curtain in line with the lowest loops to which the connector is attached, as shown in Fig. 4.

It is apparent that a rigid rod 10 cannot be left in the position shown in Fig. 1 when a collapsible top is to be folded back. It is therefore necessary to provide for the swinging of the folded curtain as shown in Fig. 3, parallel to the tops of the bows. This may be accomplished by securing fastening devices of any desired type near the center of the bow on which the rods 10 are mounted, to engage the free ends of the rods 10. One form of such fastening devices is illustrated in Fig. 6 and consists in a plate 34 adapted to be secured to the bow 5, to which plate is hinged a tongue 35 provided with a slot 37 adapted to receive the down-turned end 12 of the rod 10. When therefore it is desired to lower the top, and the curtain has been folded up to the form shown in Fig. 3, the hook 12 is disengaged from the eye 13, the chords 30 are wound around the curtain as shown in Fig. 5, the curtains are swung transversely of the vehicle, and the tongue 35 is swung over the free end of the rod 10, thereby holding the entire structure in proper position where it will not interfere with the holding back of the top.

In Fig. 2 the eyes 13 are shown projecting from the bow 5. If desired the bolts for these eyes 13 may extend through holes in washers 38 on the bow 5, any desired method being employed to hold the parts together, such as the nuts 39, shown in Fig. 5. Another device which may be employed is shown in Fig. 7 and consists of a split sleeve 40 having flanges 41 secured together by the screw 42. A rigid eye 43 extends from the sleeve 40 and into it the bent end of the rod 10 is hooked.

It will be apparent from examination of Fig. 5 that when the curtain is in the position shown in Fig. 1, there will be some space between the curtain and the lower edge of the material forming the top 9. In order to prevent snow and rain blowing up through this space, the upper edge of the curtain may be sewed down around the rod 10 along the line 45, as shown in Figs. 3 and 7, and the free edge 46 may then project outwardly so that it may contact with the lower edge of the top 9 and thus close the space between the top and the curtain.

It will be readily understood that a curtain 48, constructed as just described, may be employed as a wind-shield, and be permanently mounted on the front rod 10 of the top of the vehicle, and have its lower edge detachably secured to the upper edge of the dash-board.

The proportions of the panels of these curtains, the devices for folding them, the means for securing them in position, and the details of construction may all be changed to meet the various requirements without departing from the spirit of my invention as set forth in the following claims.

I claim.

1. In a vehicle, the combination of a body having a foldable top provided with front and rear uprights connecting it with the body, a rod within the top pivoted to one upright and detachably connected to the other upright, a flexible curtain suspended from said rod and consisting of narrow panels hinged together along horizontal lines, straps connecting to said panels and passing over said rod whereby said curtain may be raised so that said panels will hang vertically side by side along the rod and whereby a free exit and entrance space may be provided between the uprights, and means for holding said folded curtain transversely of the car with its panels vertical.

2. In a vehicle, the combination of a body having a foldable top provided with front and rear bows collapsible therewith and connecting it with the body, a rod within the top pivoted to the front bow and detachably connected to the other, a flexible curtain suspended from said rod and consisting of narrow panels hinged together along horizontal lines, means engaging said panels whereby the curtain may be so raised and folded that the panels will hang vertically side by side along the rod within the top, and means secured to the middle portion of the front bow for engaging the free end of said rod when the folded curtain is swung parallel to the bows preparatory to collapsing the top.

3. In a vehicle, the combination of a body having a top provided with front and rear bows, a rod pivoted to one of said bows, and detachably engaging the other, a curtain suspended from said rod and consisting of a series of substantially rigid panels hinged together on horizontal lines, means to fold said curtain to bring the panels up to the rod, means to hold the curtain in folded position, and means secured to one of the bows to hold the folded curtain transversely of the top with its panels vertical.

4. In a vehicle, the combination of a body having a top comprising a cover and bows to support the same, eyes secured to said bows, a rod extending between adjacent bows at one side of the vehicle and having downturned ends extending into said eyes, a curtain suspended from the rod and comprising stiff panels connected by flexible fabric on horizontal lines, each panel consisting of a center of transparent material surrounded by a border of flexible material, such as cloth, reinforced by a metal rod, a roller mounted on the rod, metal loops secured to the upper edge of each alternate panel, and a flexible connector, such as a strap, extending around said roller and down through said loops to the lowest panel, whereby said curtain may be folded.

5. In a vehicle, the combination of a body and a top therefor, a rod supported by said top, rollers mounted on the rod, a curtain suspended from said rod and consisting of a series of transparent panels and a flexible sheet of fabric connecting the panels and the supporting rod on horizontal lines, metal loops on alternate panels, and means extending around the rollers on the supporting rod and through the loops to the lowest panel whereby the curtain may be drawn up into the top.

In testimony whereof I have signed this specification in the presence of two subscribing witnesses.

WILLARD H. GOODFELLOW.

Witnesses:
EDWARD N. PAGELSEN,
HUGO W. KREINBRING.